Nov. 13, 1962 W. WARD IV 3,063,186
FISHING ROD LINE GUIDE ATTACHMENT
Filed Nov. 21, 1960
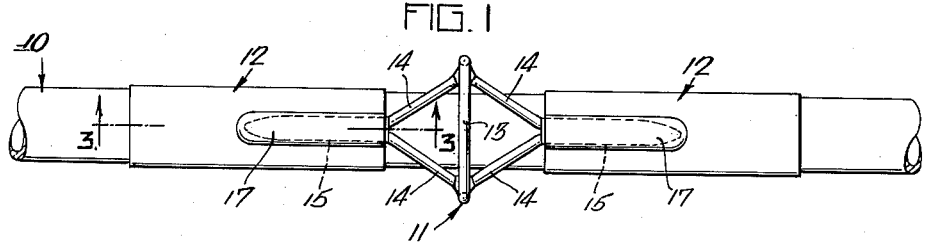
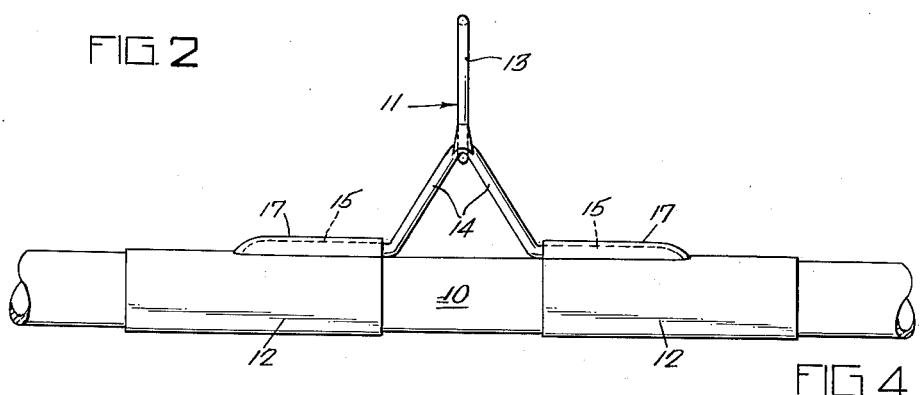
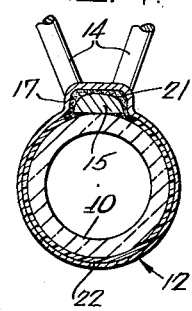
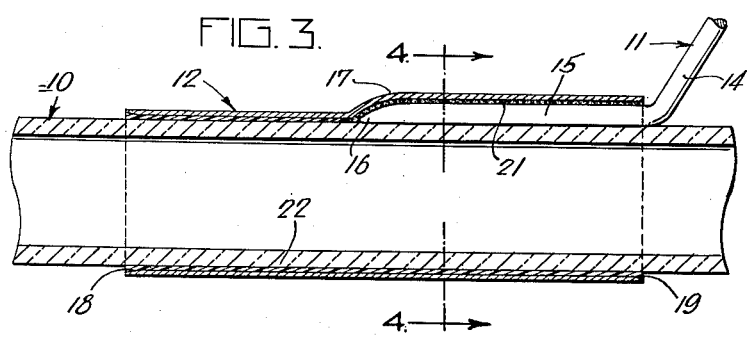
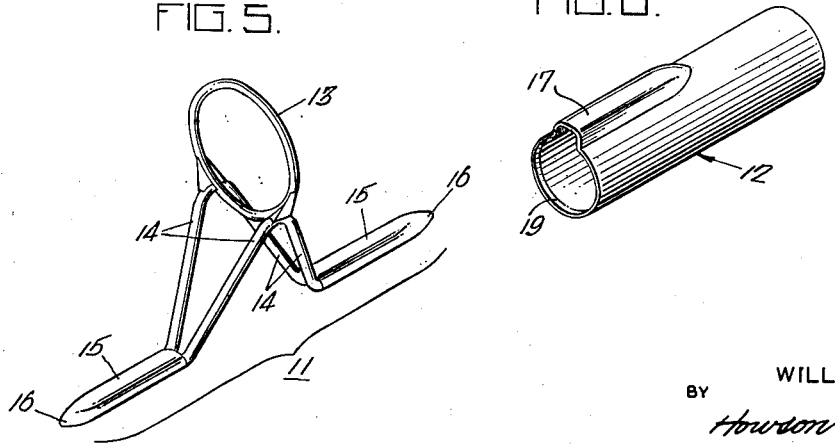
INVENTOR:
WILLIAM WARD, IV
BY
Howson & Howson
ATTYS.

United States Patent Office 3,063,186
Patented Nov. 13, 1962

3,063,186
FISHING ROD LINE GUIDE ATTACHMENT
William Ward IV, 201 Plush Mill Road,
Wallingford, Pa.
Filed Nov. 21, 1960, Ser. No. 70,738
3 Claims. (Cl. 43—24)

The present invention relates to new and useful improvements in fishing rods and more particularly to new and useful improvements in means for securing line guides and the like to a fishing rod.

In the normal construction of a fishing rod one or more line guides are secured to the rod at predetermined spaced intervals. At the present time, the conventional accepted method of securing line guides to a rod is to provide a foot on each line guide and fasten the foot of the line guide to the rod with thread, twine, tape or similar material. This is a tedious and time consuming method of securing line guides to a fishing rod and does not permanently secure the line guide to the rod. Because of continual flexing of the rod during usage, the wrapping material becomes loose and abraded and after a while, will break, thereby, causing the line guide to become loose or fall off the fishing rod. According to the present invention a line guide having a pair of feet projecting outwardly from opposite sides thereof is provided which is inserted into and secured to a pair of sleeves that extend around and are securely fastened to the fishing rod. These sleeves are so formed and so constructed that they will not interfere with normal bending of the rod and the bending of the rod will not cause the sleeve to dig into or otherwise harm the rod or sleeve.

With the foregoing in mind, a primary object of the present invention is to provide a novel means for securing a line guide to a fishing rod to provide a rugged simple and lasting attachment between the line guide and the fishing rod.

Another object of the present invention is to provide means for permitting line guides to be accurately positioned at predetermined spaced intervals along the rod and secured in place on the rod so that there may be no rotational or axial movement of the line guides relative to the rod.

A still further object of the present invention is to provide means for attaching line guides or the like to a fishing rod which may be accomplished by an individual who has had little or no previous experience in making fishing rods, thereby permitting the sale of rod blanks, line guides, and accessory equipment in kit form so that the individual may assemble the rod according to his own requirements.

These and other objects of the present invention and various features and details of the operation and construction thereof are hereinafter more fully set forth and described with reference to the accompanying drawings, in which:

FIG. 1 is a fragmentary plan view illustrating a portion of a fishing rod with a line guide secured to the rod in accordance with the present invention;

FIG. 2 is a side elevational view of the rod and line guide of FIG. 1;

FIG. 3 is an enlarged fragmentary longitudinal sectional view taken on line 3—3, FIG. 1, illustrating the means for securing the line guide to the fishing rod;

FIG. 4 is a transverse sectional view taken on line 4—4, FIG. 3;

FIG. 5 is a perspective view of a single line guide; and

FIG. 6 is a perspective view of a sleeve made in accordance with the present invention used for securing the line guide to the rod.

Referring more specifically to the drawings, FIGS. 1 and 2 illustrate a portion of a fishing rod made in accordance with the present invention comprising a rod blank 10 of predetermined length, which normally tapers inward uniformly toward its tip or upper end, and having a plurality of line guides 11 secured at spaced intervals along the length of the rod with each line guide 11 being secured in position by means of a pair of sleeves 12, 12. While the drawings illustrate a single line guide secured to a fragment of a rod, it will be understood that in a conventional rod a plurality of line guides are secured at spaced intervals along the length of the rod with the line guides generally being of decreasing size as they approach the tip of the rod.

Each line guide 11 comprises a generally circular ring portion 13 adapted to be secured in spaced relation to a rod 10 with its axis spaced from and parallel to the axis of the rod. This is accomplished by providing a plurality of legs 14 secured to the ring, for example, by brazing, soldering, or the like with legs diverging downwardly and outwardly away from opposite sides of the ring toward the rod. The leg portions 14 terminate at their lower ends in a pair of aligned spaced apart feet 15, 15 extending generally parallel to the axis of the ring 13 and adapted to engage the peripheral surface of the rod. The feet 15 preferably have a flat lower surface which engages the rod blank and an arcuate upper surface so that the cross-sectional area of the feet, as illustrated in FIG. 4, is semi-elliptical with each foot terminating at its outer end in a tapered end portion 16. The ring, legs, and feet preferably are formed of steel with the ring being formed of a wear resistant steel such as carbide steel to prevent undue wear during use.

In accordance with the present invention the line guide 11 is secured to the rod by means of the sleeves 12, 12 with each sleeve being securely fastened to both the rod and the line guide foot to secure the line guide axially of the rod and to prevent sideward movement and rocking of the line guide relative to the rod. Additionally, the sleeves, in accordance with the present invention, are so dimensioned relative to the diameter of the rod and are formed in such a manner that during flexing of the rod the sleeve is not caused to become loose on the rod and will not damage the rod or interfere with the flexing of the rod.

The sleeves 12, as illustrated in the drawings, are formed of a continuous length of metal tubing and are of generally cylindrical shape with an enlarged portion at one edge of the sleeve adjacent the line guide 11 forming a pocket 17 operable to receive the line guide foot 15. The sleeves 12 are dimensioned to fit snugly on the rod 10 and preferably are tapered to correspond to the taper of the rod with the sleeves so dimensioned that they will snugly engage the rod at predetermined locations, thereby locating the position of the line guide 11.

To prevent the sleeve from interfering with the proper flexing of the rod the sleeve is relatively short in length as compared to its diameter, the length of the sleeve being approximately three times as long as its diameter. Additionally, the sleeve should be formed of a relatively soft distortable material, and it has been found that the ideal material for the sleeve is No. 316 annealed stainless steel with a wall thickness of approximately 0.010 inch. This material is formed in accordance with ASTM specification A–269 with the Brinell hardness being less than 200. Further, the opposite ends of the tubing are flared or rolled outwardly about their inner edge as indicated at 18 and 19 in FIG. 3 so that there are no sharp edges of the tube closely adjacent to the fishing rod which will cause the tube to cut into the fishing rod when it is flexed.

To assemble a rod made in accordance with the present invention the pocket portion 17 of each sleeve 12 is filled with a conventional liquid solder and the upper and lower surfaces of the feet 15 of the line guides 11 are coated with liquid solder. Thereafter, the inside of the sleeve is coated over its entire area with the exception of that portion of the sleeve defining the pocket 17 with a cement which will adhere to both the material of the sleeve and the material of the rod and be relatively flexible when dry. Preferably the cement may be a rubber base cement such as Pliobond. The rod is then inserted into the sleeve with the sleeve in proper position and a foot portion 15 of the line guide is inserted into the sleeve pocket portion 17. The second sleeve is also treated in the same manner and positioned on the rod over the opposite foot of the line guide thereby securing the line guide to the rod in the position as illustrated in FIGS. 1 and 2. The liquid solder will harden forming a bond between the foot of the line guide and the sleeve as illustrated at 21 in FIG. 3 and the cement forms a bond between the sleeve and rod as indicated at 22 in FIG. 3, thereby providing a structure in which the sleeve 12 is firmly secured to both the rod and the line guide. After each of the line guides have been positioned on the rod and the desired tip, not shown, secured to the rod the openings of the various line guides and tip are aligned with one another and with the reel seat and the liquid solder and cement are allowed to harden. The person assembling the rod may then secure the desired end grips to the rod in the desired locations and complete the assembly of the rod.

From the foregoing, it will be apparent that the present invention provides novel means for securing line guides and the like to fishing rod blanks in such a manner that a relatively unskilled person may assemble a rod to meet his own specifications to obtain a custom fishing rod at much lower cost than if he had to order a rod custom made to his own specifications. Additionally, it will be apparent that the present invention provides novel means for securing line guides and the like to a fishing rod without using the present conventional method of wrapping the foot of the line guide with thread, twine or similar material.

While a particular embodiment of the present invention has been illustrated and described herein it is not intended to limit the invention to such a disclosure and changes and modifications may be incorporated and embodied therein within the scope of the following claims.

I claim:

1. In combination, a fishing rod having a predetermined uniform taper, a line guide having a guide opening adapted to be secured to said rod at a predetermined position, a pair of foot members projecting outwardly from opposite sides of said line guide in a direction extending axially of said rod, a pair of sleeve members of generally cylindrical form made of a relatively soft distortable material, each of said sleeve members having a tapered central opening corresponding to the taper of said rod and adapted to be mounted on said rod at predetermined locations at opposite sides of said predetermined position of said line guide, each of said sleeve having a pocket portion therein with the pocket portion of each sleeve facing toward said line guide and overlying and receiving a foot member of said line guide, a liquid solder bonding said line guide foot members to said sleeves and said rod, and a relatively resilient cement bonding said sleeve and said rod together and forming a flexible generally cylindrical layer of said resilient cement between said sleeve and said rod, said resilient layer and said distortable sleeve members permitting free flexing movement of said rod along its length.

2. Apparatus in accordance with claim 1 wherein the opposite ends of said sleeves are flared outwardly away from said rod.

3. Apparatus in accordance with claim 1 wherein the length of said sleeves is not more than approximately three times the diameter of said sleeves.

References Cited in the file of this patent

UNITED STATES PATENTS

| | | | |
|---|---|---|---|
| 427,162 | Edwards | May 6, | 1890 |
| 564,742 | Dunn | July 28, | 1896 |
| 670,961 | Lenharth | Apr. 2, | 1901 |
| 953,775 | Becraft | Apr. 5, | 1910 |
| 1,871,229 | Welch | Aug. 9, | 1932 |
| 1,902,749 | Baird et al. | Mar. 21, | 1933 |
| 1,923,263 | Heddon | Aug. 22, | 1933 |
| 2,018,923 | Potter | Oct. 29, | 1935 |
| 2,098,222 | Barnhart | Nov. 9, | 1937 |
| 2,197,358 | Benson | Apr. 16, | 1940 |
| 2,227,868 | Tengel | Jan. 7, | 1941 |
| 2,262,300 | Reynolds | Nov. 11, | 1941 |
| 2,360,802 | Stenz | Oct. 17, | 1944 |
| 2,379,990 | Rembert | July 10, | 1945 |
| 2,665,678 | Bear | Jan. 12, | 1954 |
| 2,749,643 | Scott | June 12, | 1956 |

FOREIGN PATENTS

| | | | |
|---|---|---|---|
| 571,662 | Canada | Mar. 3, | 1959 |
| 1,088,082 | France | Sept. 1, | 1954 |
| 1,184,340 | France | Feb. 2, | 1959 |

OTHER REFERENCES

Popular Mechanics, June 1945, page 114.